Aug. 7, 1945.  B. E. HOUSE  2,381,746
BRAKE
Filed May 11, 1942  2 Sheets-Sheet 1
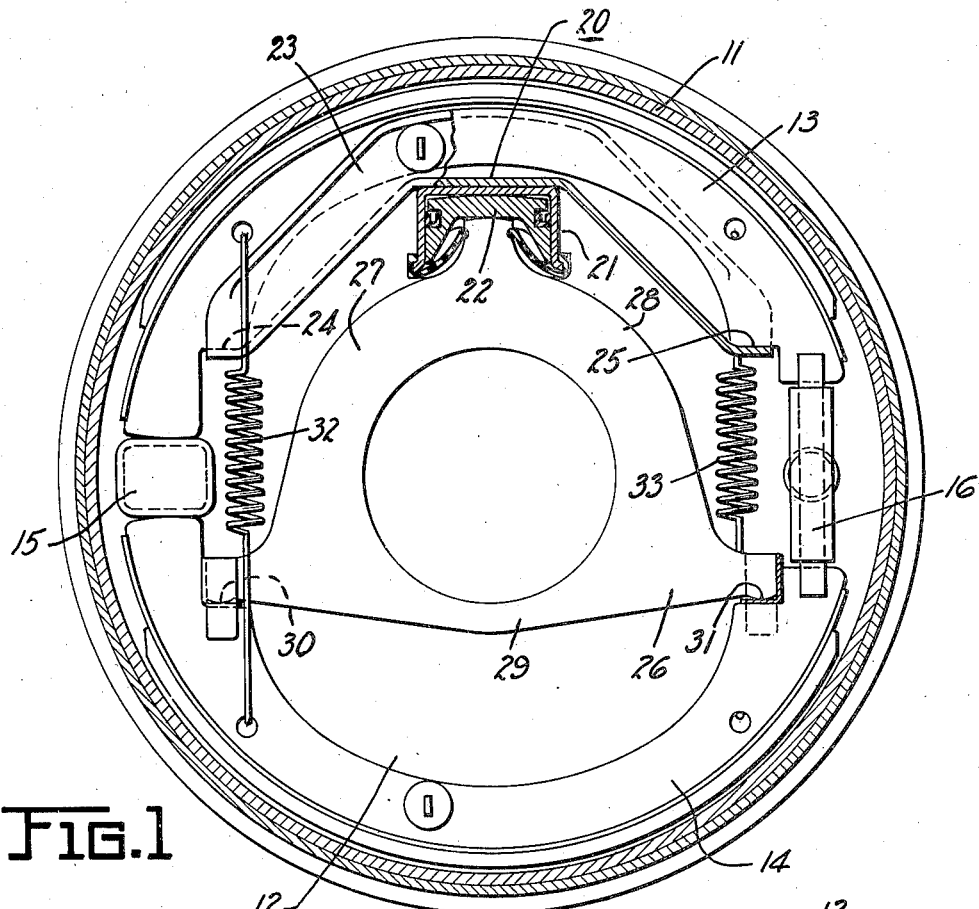
Fig.1
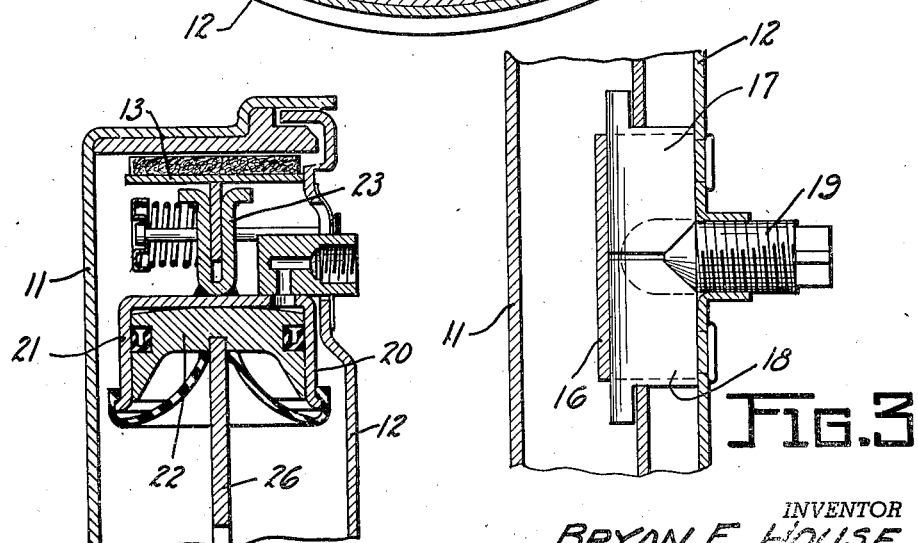
Fig.2
Fig.3
INVENTOR
BRYAN E. HOUSE
BY
M. W. McConkey
ATTORNEY Aug. 7, 1945.   B. E. HOUSE   2,381,746
BRAKE
Filed May 11, 1942   2 Sheets-Sheet 2

INVENTOR
BRYAN E. HOUSE
BY
M. W. McConkey
ATTORNEY

Patented Aug. 7, 1945

2,381,746

UNITED STATES PATENT OFFICE 2,381,746

BRAKE

Bryan E. House, South Bend, Ind., assignor to Bendix Aviation Corporation, South Bend, Ind., a corporation of Delaware Application May 11, 1942, Serial No. 442,407

11 Claims. (Cl. 188—152)

This invention relates to internal shoe drum brakes and particularly to brakes which have a plurality of friction elements or shoes individually shiftable to anchor at opposite ends depending upon the direction of drum rotation.

My invention comprehends the use of a single fluid pressure expanding device to move the individually shiftable brake shoes simultaneously against a brake drum, said fluid pressure expansible motor having one member adjacent one shoe for pushing the same outwardly, and another member which moves a thrust transmitting element which extends across the brake to act on a second shoe.

Among the advantages of my improved brake are the following: First, a single actuating means or fluid pressure expansible motor is used to spread two individually shiftable shoes simultaneously against a brake drum. Second, the pressure of the motor against the shoes is exerted through direct thrust connections and the friction attendant upon the use of levers is thereby eliminated.

Other advantages and desirable features of my invention will become apparent during the course of the following description, reference being made therein to the attached drawings in which:

Fig. 1 is a vertical section taken through a brake friction assembly on a line just inside the head of the brake drum and showing brake shoes in side elevation;

Fig. 2 is a section taken on the line 2—2 of Fig. 1;

Fig. 3 is a section taken on the line 3—3 of Fig. 1; and

Figure 4:
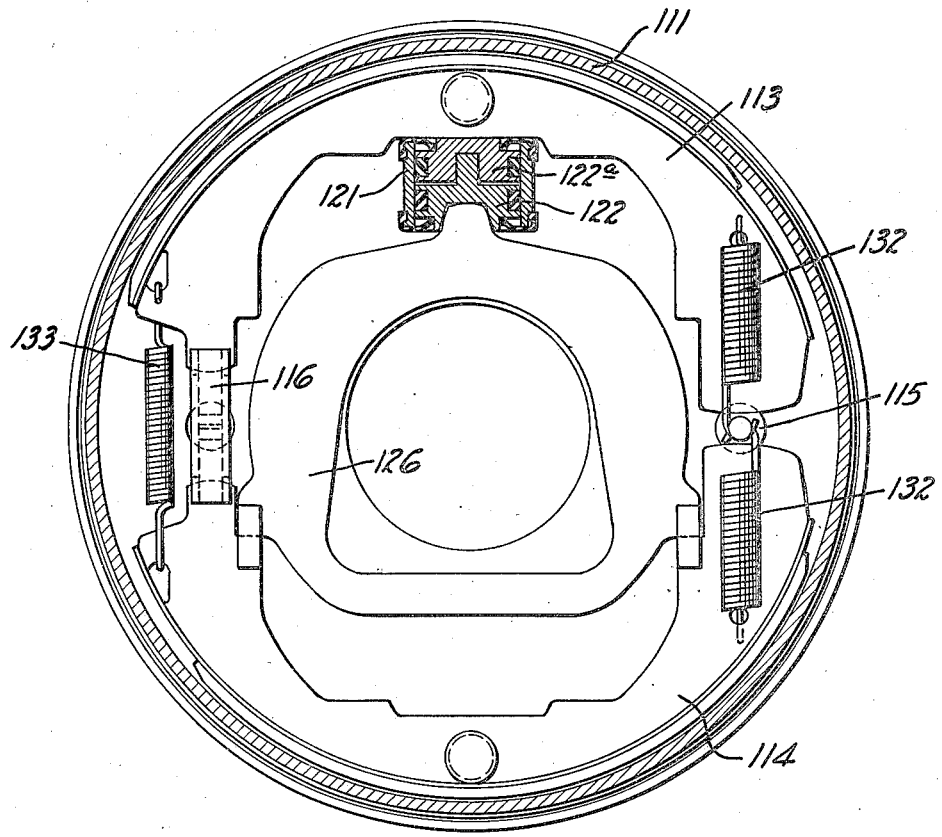
Fig. 4 is a vertical section through a brake assembly showing a modification of the brake of Fig. 1.

The brake shown in Figures 1–3 inclusive comprises generally a rotatable brake drum 11, a non-rotatable backing plate or support 12, two individually shiftable brake shoes 13 and 14 mounted on the backing plate, and anchoring and applying means for the shoes. If we assume that the arrow in Fig. 1 indicates the direction of forward rotation of the brake drum, then when the wheel is turning forwardly, as the brakes are applied, shoe 13 will anchor on a block 15 and shoe 14 will anchor on an adjustment mechanism 16. If the drum is rotating in a rearward direction, and the shoes are applied, shoe 14 will anchor on the block 15 and shoe 13 will anchor on the adjusting member 16. The adjusting member 16 as shown comprises a pair of separable blocks 17 and 18 and a wedge 19 between the blocks secured to the backing plate 12. Rotation of the wedge 19, which may be accomplished by turning the head thereof outside the backing plate, will move the wedge to spread the blocks 17 and 18 and through them spread the shoes 13 and 14 which they respectively contact.

The chief novelty of the brake disclosed herein lies in the applying means which comprises a hydraulic motor 20 positioned adjacent the web of shoe 13, said motor having a casing 21 which can be moved radially toward the drum and a piston 22 which can be moved diametrically toward the opposite side of the drum. Admission of fluid to the hydraulic motor between the piston and the casing serves to spread the two and each exerts an applying force on one of the shoes. The casing exerts an applying force through a thrust member 23 which in turn exerts an equalized lifting force on both ends of shoe 13, contact between the thrust member 23 and the shoe 13 being had at the points 24 and 25. The force of the fluid on the piston 22 is exerted through a thrust member in the form of a yoke 26 on the ends of shoe 14, the yoke being in effect a thrust device extending across the brake having thrust arms 27 and 28 and a connecting arm 29 conveniently positioning the thrust arms. Contact between the arms 27 and 28 of the yoke and the ends of shoe 14 is made at 30 and 31 respectively. When the shoes are applied to the drum and tend to rotate with the drum to anchor, the whole applying mechanism may rotate slightly, i. e. the casing and piston of the hydraulic motor 20, the thrust member 23, and the thrust member 26 may turn slightly relative to the support. The shoes are normally maintained in released position by return springs 32 and 33 which hold them against the anchor members 15 and 16.

In the modified brake assembly of Fig. 4, brake shoes 113 and 114 may be applied to brake drum 111 in a manner closely similar to brake shoes 13 and 14 of Fig. 1. In the modification of Fig. 4 a hydraulic cylinder 121 has pistons 122 and 122a reciprocable therein. Piston 122a exerts a direct force against the center of shoe 113, while piston 122 exerts force through yoke 126 on shoe 114. Adjusting and anchoring of the shoes 113 and 114 is similar to adjusting and anchoring of shoes 13 and 14 of Fig. 1. A pair of springs 132 hold the shoes in released position against anchor 115, while a single spring 133 positioned between the drum and the combined anchoring and adjusting member 116 holds the shoes in released position against said member 116. Operation of the device of Fig. 4 is in all respects similar to the operation of the device of Fig. 1 except that force against shoe 113 is exerted at the center thereof.

Being aware of the possibilities of modifications in the particular structures herein described without departing from the fundamental principles of my invention, I do not intend that their scope be limited except as set forth by the appended claims.

I claim:

1. A brake comprising a rotatable brake drum, shoes which are individually shiftable to anchor at either end depending upon the direction of drum rotation at the time they contact the drum, a hydraulic motor positioned inside the brake drum and near the center of one of the shoes, said motor having two parts which may be spread apart by fluid pressure, a thrust member contacting both ends of the shoe near the hydraulic motor and adapted to be thrust by movement of one of the parts of the motor to apply said shoe, and thrust means extending across the brake to contact both ends of the shoe opposite the hydraulic motor and adapted to be moved by the other of the parts of the motor to thrust said opposite shoe against the brake drum.

2. A brake comprising a rotatable brake drum, shoes which are individually shiftable to anchor at either end depending upon the direction of drum rotation at the time they contact the drum, a hydraulic motor positioned inside the brake drum and near the center of one of the shoes, said motor having two parts which may be spread apart by fluid pressure, one of said parts being operatively connected to the shoe near the hydraulic motor to apply said shoe, and thrust means extending across the brake to contact both ends of the shoe opposite the hydraulic motor and adapted to be moved by the other of the parts of the motor to thrust said opposite shoe against the brake drum.

3. A brake comprising a rotatable brake drum, shoes which are individually shiftable to anchor at either end depending upon the direction of drum rotation at the time they contact the drum, a hydraulic motor positioned inside the brake drum and near the center of one of the shoes, said motor having two parts which may be spread apart by fluid pressure, a thrust member contacting the shoe near the hydraulic motor and adapted to be thrust by movement of one of the parts of the motor to exert equal applying force simultaneously against both ends of said shoe and thrust means extending across the brake to contact the shoe opposite the hydraulic motor and adapted to be moved by the other of the parts of the motor to exert equal applying force simultaneously against both ends of said opposite shoe.

4. A brake comprising a rotatable brake drum having a cylindrical braking surface, two arcuate shoes which form a substantially complete cylindrical surface facing the drum and which are individually shiftable to anchor at either end depending upon the direction of drum rotation at the time they contact the drum, a hydraulic motor positioned inside the brake drum and near the center of one of the shoes, said motor having two parts which may be radially spread apart by fluid pressure, one of which parts exerts an applying force on one of the shoes, and the other of which parts exerts an applying force on the other of said shoes.

5. A brake comprising a rotatable brake drum, two semicircular shoes which are individually shiftable to anchor at either end depending upon the direction of drum rotation at the time they contact the drum, a hydraulic motor positioned inside the brake drum and near the center of one of the shoes, said motor having two parts which may be radially spread apart by fluid pressure, one of which parts exerts an applying force on one of the shoes, and the other of which parts exerts an applying force on the other of said shoes.

6. A brake comprising a rotatable brake drum, two shoes which are individually shiftable to anchor at one end or the other according to the direction of drum rotation, fixed anchors at both ends of both shoes, each of said shoes extending substantially half the circumference of the drum, and a hydraulic motor disposed within the drum between the ends of one of the shoes and having oppositely disposed members which move substantially along a radius of the brake under the influence of fluid pressure, each of said oppositely disposed members being adapted to individually thrust one of said shoes against the brake drum.

7. A brake comprising a rotatable brake drum, two shoes positioned therein which are individually shiftable to anchor at one end or the other depending upon the direction of drum rotation, each of said shoes extending substantially 180° of the drum circumference, anchors between the shoes at both ends thereof, a hydraulic motor disposed within said drum and located between the ends of one of the shoes, and a strut extending from the motor across the brake to contact the other shoe, said hydraulic motor having oppositely disposed members which spread under the influence of fluid pressure, one of said members acting against the nearer of the two shoes and the other member acting through the strut against the other shoe.

8. A brake comprising a rotatable brake drum having a cylindrical braking surface, two arcuate webbed shoes positioned therein which are individually shiftable to anchor at one end or the other depending upon the direction of drum rotation, each of said shoes extending substantially 180° of the drum circumference, anchors at both ends of both shoes, a hydraulic motor disposed within said drum and located between the ends of one of the shoes, and thrust means extending across the brake to contact the other shoe, said hydraulic motor having oppositely disposed members which spread under the influence of fluid pressure acting along a diameter of the brake and in the plane of the brake shoe webs, one of said members acting against the nearer of the two shoes and the other member acting through the thrust means against the other shoe.

9. A brake comprising a rotatable brake drum having a cylindrical braking surface, a non-rotating support member, two arcuate shoes positioned within said brake drum and individually shiftable to anchor at one end or the other depending upon the direction of drum rotation, each of said shoes extending substantially 180° of the drum circumference, anchors provided on said support member for both ends of both shoes, a hydraulic cylinder disposed within said drum and secured to said support member near the center of one of the shoes, and thrust means extending across the brake to contact the other shoe, said hydraulic cylinder having oppositely disposed pistons therein which spread substantially along a diameter of the brake assembly under the influence of fluid pressure acting in said cylinder, one of said pistons being arranged to exert an outward force on the nearer of the two shoes and the other of said pistons being arranged to exert an outward force on the other shoe through the intermediary of the thrust means, each of said shoes being capable of circumferential movement relative to the fixed position of the hydraulic cylinder.

10. A brake comprising a rotatable brake drum having a cylindrical braking surface, a non-rotating support member, two arcuate shoes positioned within said brake drum and individually shiftable to anchor at one end or the other depending upon the direction of drum rotation, each of said shoes extending substantially 180° of the drum circumference, anchors provided on said support member for both ends of both shoes, a hydraulic cylinder disposed within said drum and secured to said support member near the center of one of the shoes, and thrust means extending across the brake to contact the other shoe, said hydraulic cylinder having oppositely disposed pistons therein which spread substantially along a diameter of the brake assembly under the influence of fluid pressure acting in said cylinder, one of said pistons being arranged to exert an outward force on the nearer of the two shoes and the other of said pistons being arranged to exert an outward force on the other shoe through the intermediary of the thrust means, each of said shoes being capable of circumferential movement relative to the fixed position of the hydraulic cylinder, said thrust means being arranged to pivot on its associated piston as the farther shoe makes such circumferential movement.

11. A brake comprising a rotatable brake drum having a cylindrical braking surface, two arcuate shoes positioned within said brake drum and individually shiftable to anchor at one end or the other depending upon the direction of drum rotation, each of said shoes extending substantially 180° of the drum circumference, anchors provided on said support member for both ends of both shoes, the ends of said shoes having sliding contact along said anchors to facilitate full drum contact during braking, a hydraulic cylinder disposed within said drum and located near the center of one of the shoes, and thrust means extending across the brake to contact the other shoe, said hydraulic cylinder having oppositely disposed pistons therein which spread substantially along a diameter of the brake assembly under the influence of fluid pressure acting in said cylinder, one of said pistons being arranged to exert an outward force on the nearer of the two shoes and the other of said pistons being arranged to exert an outward force on the other shoe through the intermediary of the thrust means, each of said shoes being capable of circumferential movement relative to the fixed position of the hydraulic cylinder.

BRYAN E. HOUSE.